US012784924B2

(12) United States Patent
Oh et al.

(10) Patent No.: US 12,784,924 B2
(45) Date of Patent: Nov. 3, 2026

(54) METHOD FOR DEALING WITH ANTICIPATED TRANSIENT WITHOUT SCRAM IN NUCLEAR POWER PLANT, AND SYSTEM THEREFOR

(71) Applicant: KOREA HYDRO & NUCLEAR POWER CO., LTD, Gyeongju-si (KR)

(72) Inventors: Ji Yong Oh, Daejeon (KR); Keun Seong Lee, Daejeon (KR); Sun Guk Kwon, Daejeon (KR)

(73) Assignee: KOREA HYDRO & NUCLEAR POWER CO., LTD, Gyeongju-si (KR)

( * ) Notice: Subject to any disclaimer, the term of this patent is extended or adjusted under 35 U.S.C. 154(b) by 261 days.

(21) Appl. No.: 18/715,888

(22) PCT Filed: Mar. 22, 2023

(86) PCT No.: PCT/KR2023/003789
§ 371 (c)(1),
(2) Date: Jun. 3, 2024

(87) PCT Pub. No.: WO2023/195663
PCT Pub. Date: Oct. 12, 2023

(65) Prior Publication Data
US 2025/0029742 A1 Jan. 23, 2025

(30) Foreign Application Priority Data
Apr. 5, 2022 (KR) ........................ 10-2022-0042269

(51) Int. Cl.
*G21D 3/06* (2006.01)
*G21C 9/004* (2006.01)

(52) U.S. Cl.
CPC ............... *G21D 3/06* (2013.01); *G21C 9/004* (2013.01)

(58) Field of Classification Search
CPC ........... G21D 3/06; G21C 9/004; G21C 15/18
USPC .................................................. 376/216, 282
See application file for complete search history.

(56) References Cited

FOREIGN PATENT DOCUMENTS

| | | | |
|---|---|---|---|
| CN | 104332188 | A | 2/2015 |
| EP | 0 185 455 | A1 | 6/1986 |
| KR | 10-2001-0076543 | A | 8/2001 |
| KR | 10-1535479 | B1 | 7/2015 |

(Continued)

OTHER PUBLICATIONS

Akter, "Comparative analysis of thermal hydraulic parameters of AP-1000 and VVER-1200 nuclear reactor for turbine trip concurrent with anticipated transient without SCRAM (ATWS)", In 2021 International Conference on Automation, Control and Mechatronics for Industry 4.0 (ACMI), pp. 1-6. IEEE, 2021. (Year: 2021).*

(Continued)

*Primary Examiner* — Jack W Keith
*Assistant Examiner* — Daniel Wasil

(57) ABSTRACT

The present invention relates to a method for dealing with anticipated transient without scram in a nuclear power plant, and a system therefor. The method for dealing with anticipated transient without scream in a nuclear power plant, according to the present invention, comprises the steps of: identifying the pressure of a pressurizer; determining an accident level on the basis of the determined pressure of the pressurizer; and activating safeguards related to the pressure, according to the accident level.

5 Claims, 3 Drawing Sheets

(56) References Cited

FOREIGN PATENT DOCUMENTS

KR 10-2021-0039782 A 4/2021

OTHER PUBLICATIONS

M. K. Kim et al., "Analysis of Risk-Informed ATWS," Proceedings of the Korean Nuclear Society Conference, 2003.
D. Y. Oh et al., "Safety Evaluation during ATWS with/without AMSAC," Proceedings of the Korean Nuclear Society Conference, 2002.
The Extended European Search Report for European Patent Application No. 23784891.6, dated Feb. 16, 2026.

* cited by examiner

METHOD FOR DEALING WITH ANTICIPATED TRANSIENT WITHOUT SCRAM IN NUCLEAR POWER PLANT, AND SYSTEM THEREFOR

CROSS-REFERENCE TO RELATED APPLICATIONS

This application is the National Stage filing under 35 U.S.C. 371 of International Application No. PCT/KR2023/003789, filed on Mar. 22, 2023, which claims the benefit of Korean Patent Application No. 10-2022-0042269, filed on Apr. 5, 2022, the contents of which are all hereby incorporated by reference herein in their entirety.

TECHNICAL FIELD

The disclosure relates to a method of dealing with anticipated transient without safety control rod actuation mechanism (SCRAM) (hereinafter referred to as "ATWS") in a reactor coolant system of a nuclear power plant, and a system therefor.

Background Art

In a reactor coolant system, anticipated transient without safety control rod actuation mechanism (SCRAM) (hereinafter referred to as "ATWS") refers to an accident that occurs when a reactor does not stop as no signals are generated even though a reactor shutdown is required.

In the existing reactor coolant system, a diverse protection system (DPS) has been designed as a system for dealing with the ATWS, but it is still not easy to cope with the ATWS caused by mechanical failure of a control rod.

Therefore, a comprehensive and automatic coping system is required according to the severity level of the ATWS.

DISCLOSURE

Technical Problem

Accordingly, an aspect of the disclosure is to provide a method of dealing with anticipated transient without safety control rod actuation mechanism (SCRAM) (hereinafter referred to as "ATWS") in a reactor coolant system of a nuclear power plant, and a system therefor.

Technical Solution

The aspect of the disclosure is achieved by a method of dealing with anticipated transient without safety control rod actuation mechanism (SCRAM) (hereinafter referred to as ATWS) in a nuclear power plant, the method including: checking pressure of a pressurizer; identifying an accident level based on the checked pressure of the pressurizer; and operating safety feature related to the pressure based on the accident level.

The safety feature may include a squib valve that is connected to the pressurizer and opened by an explosion.

The safety feature may further include a diverse SCRAM system (DSS), an auxiliary feedwater system, a reactor coolant pump (RCP), a pilot operated safety relief valve (POSRV), an emergency rapid depressurization valve (ERDV), and an in-vessel retention ex reactor vessel cooling (IVR-ERVC) system.

The identification of the accident level may include identifying that the higher the pressure of the pressurizer, the higher the accident level, the squib valve may be opened at a level higher than a level at which at least one of the DSS, the turbine system, the auxiliary feedwater system, the RCP, the POSRV, and the ERDV operates, and the IVR-ERVC system may operate at a level higher than the level at which the squib valve operates.

The auxiliary feedwater system may include a passive auxiliary feedwater system (PAFS).

The method may further include identifying whether a necessary measure is performed for each accident level based on the positions of control rods, the number of opened POSRVs, and the number of opened ERDVs.

Another aspect of the disclosure is achieved by a system for coping with anticipated transient without safety control rod actuation mechanism (SCRAM) (hereinafter referred to as ATWS) in a reactor coolant system of a nuclear power plant, the system including: an input unit that receives pressure of a pressurizer; an accident level identification unit that identifies an accident level based on the checked pressure of the pressurizer; and a safety feature operation unit that instructs safety feature related to the pressure to operate based on the accident level identified by the accident level identification unit.

The safety feature may include a squib valve that is connected to the pressurizer and opened by an explosion.

The safety feature may further include a diverse SCRAM system (DSS), an auxiliary feedwater system, a reactor coolant pump (RCP), a pilot operated safety relief valve (POSRV), an emergency rapid depressurization valve (ERDV), and an in-vessel retention ex reactor vessel cooling (IVR-ERVC) system.

The accident level identification unit may identify that the higher the pressure of the pressurizer, the higher the accident level, and the safety feature operation unit may instruct the squib valve to be opened at a level higher than a level at which at least one of the DSS, the turbine system, the auxiliary feedwater system, the RCP, the POSRV, and the ERDV operates, and instruct the IVR-ERVC system to operate at a level higher than the level at which the squib valve operates.

The system may further include a necessary measure check unit that identifies whether a necessary measure is performed for each accident level based on the positions of control rods, the number of opened POSRVs, and the number of opened ERDVs.

Advantageous Effects

According to the disclosure, there are provided a method of dealing with anticipated transient without safety control rod actuation mechanism (SCRAM) (hereinafter referred to as "ATWS") in a reactor coolant system of a nuclear power plant, and a system therefor.

MODE FOR INVENTION

A system for copying with anticipated transient without safety control rod actuation mechanism (SCRAM) (hereinafter referred to as "ATWS") according to an embodiment of the disclosure will be described with reference to FIGS. 1 and 2.

Figure 1:
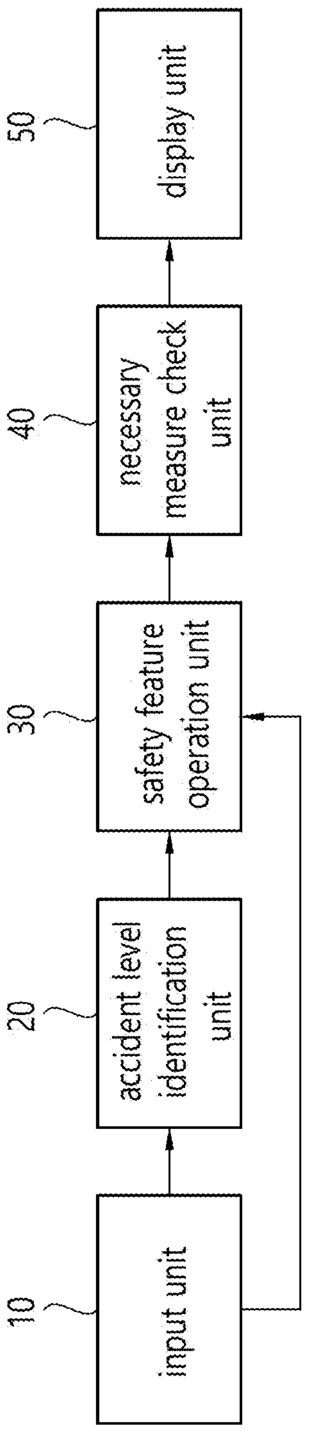
FIG. 1 illustrates the configuration of a coping system according to an embodiment of the disclosure.
Figure 2:
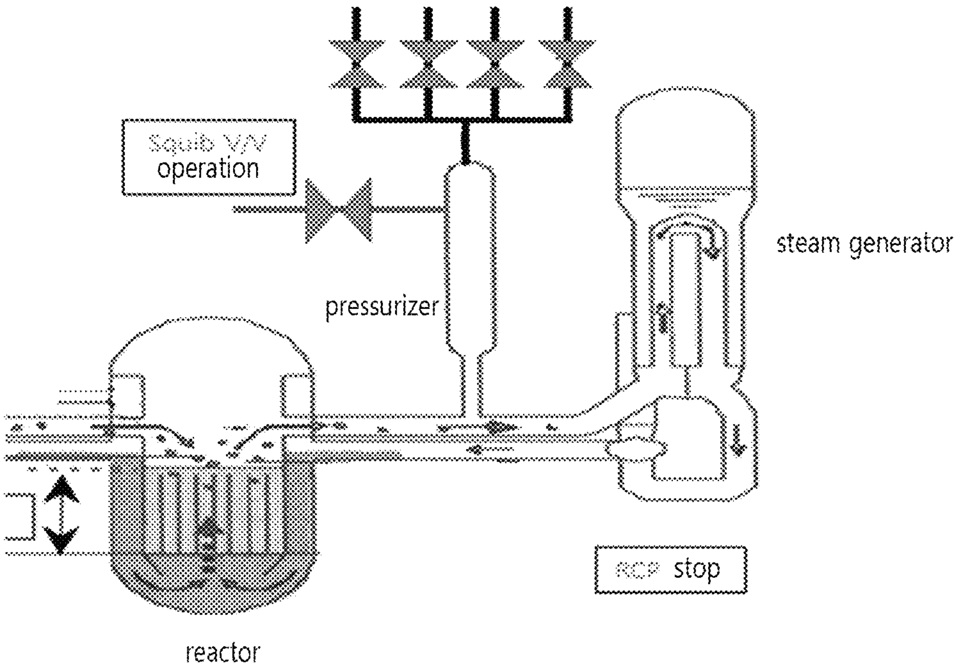
FIG. 2 illustrates the configuration of a nuclear power plant to which the disclosure is applied.

FIG. 1 illustrates the configuration of a coping system according to an embodiment of the disclosure, and FIG. 2 illustrates the configuration of a nuclear power plant to which the disclosure is applied.

A coping system 1 includes an input unit 10, an accident level identification unit 20, a safety feature operation unit 30, a necessary measure check unit 40, and a display unit 50.

The input unit 10 receives the pressure of a pressurizer.

The accident level identification unit 20 identifies an accident level based on the received pressure of the pressurizer, and identifies that the higher the pressure, the higher the accident level. The identification of the accident level may be based on a look-up table.

The safety feature operation unit 30 instructs the safety feature to operate in connection with the pressure according to the accident levels identified by the accident level identification unit. The safety feature include a squib valve, a diverse SCRAM system (DSS), a turbine system, an auxiliary feedwater system, a reactor coolant pump (RCP), a pilot operated safety relief valve (POSRV), an emergency rapid depressurization valve (ERDV), and an in-vessel retention ex reactor vessel cooling (IVR-ERVC) system.

The squib valve may be connected to the pressurizer, and may be opened by an explosion. Through the squib valve, the pressure of a reactor coolant may be significantly relieved before proceeding to extreme overpressure. For example, the capacity of the squib valve may be designed to discharge the reactor coolant more than about 1 Mkg/hr.

The ERDV is connected to the pressurizer, and refers to a system for depressurizing the reactor so as to be used even through the POSRV does not operate in a severe accident (high radiation environment).

The auxiliary feedwater system may include a passive auxiliary feedwater system (PAFS).

It is identified that the higher the pressure of the pressurizer, the higher the accident level, and the identification may be based on a look-up table such as the following Table 1.

TABLE 1

| levels | First level ATWS | Second level Excessive ATWS | Third level Extreme ATWS |
|---|---|---|---|
| Pressure of pressurizer | P > 2600 psi | P > 3000 psi | P > 3200 psi |
| necessary measures and accident results | The early state of the ATWS, which needs to be prevented from progressing continuously | The considerably progressed stage of the ATWS, which needs to be artificially and rapidly decreased in the pressure of the reactor coolant through the squib valve (explosive valve) | The core damage due to all the reactor coolant check valves stuck in the reverse direction, which needs to prepare for a severe accident |

Next, the safety feature are operated according to the accident levels (S300). The safety feature may include the squib valve, the DSS, the turbine system, the auxiliary feedwater system, the RCP, the POSRV, the ERDV, and the IVR-ERVC system.

The squib valve may be opened at a level higher than a level at which at least one of the DSS, the turbine system, the auxiliary feedwater system, the RCP, the POSRV, and the ERDV operates.

The IVR-ERVC system may operate at a level higher than the level at which the squib valve operates.

Specifically, the operations of the safety feature for each level may be performed as shown in the following Table 2.

TABLE 2

| Accident levels | DSS | auxiliary feedwater start/turbine stop | All RCP stop | All POSRV open | All ERDV open | Squib valve open | IVR-ERVC Strategy execution |
|---|---|---|---|---|---|---|---|
| First level | ○ | ○ | ○ | ○ | ○ | | |
| Second level | ○ | ○ | ○ | ○ | ○ | ○ | |
| Third level | ○ | ○ | ○ | ○ | ○ | ○ | ○ |

The initial state maintenance identification unit 40 identifies whether the initial state is maintained for each level based on the positions of control rods, the number of opened POSRVs, and the number of opened ERDVs.

The display unit 50 displays information input through a display device, an accident level, a safety feature operation, etc. for an operator.

Below, a method of coping with the ATWS will be described in more detail.

Figure 3:
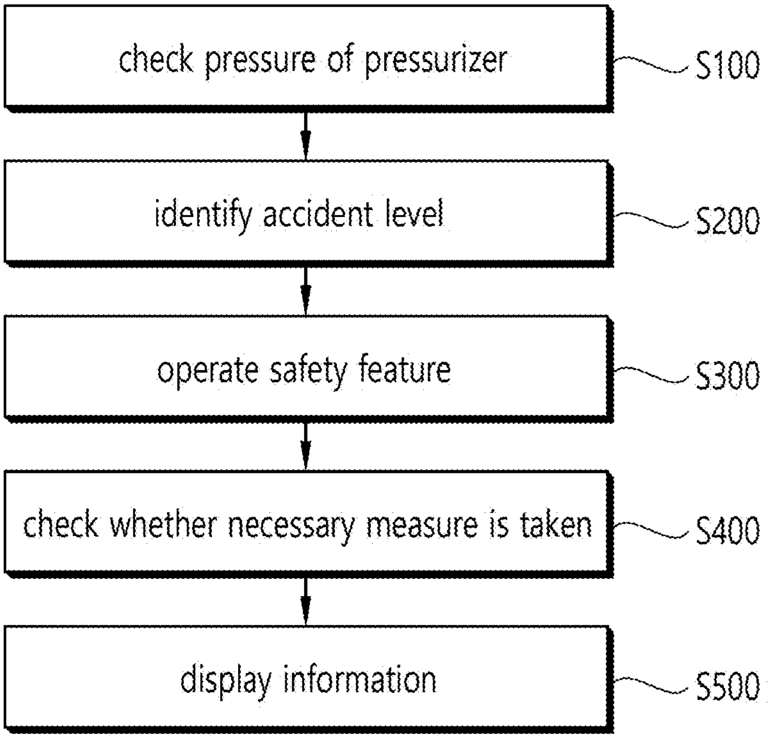
FIG. 3 is a flowchart showing a method of dealing with anticipated transient without SCRAM (hereinafter referred to as "ATWS") according to an embodiment of the disclosure.

FIG. 3 is a flowchart showing a method of dealing with loss of coolant accident according to an embodiment of the disclosure.

First, the pressure of the pressurizer is checked (S100).

The pressure of the pressurizer may be checked based on a sensing value received from a pressure sensor of the pressurizer.

Then, an accident level is identified based on the pressure of the pressurizer (S200).

The detailed measures against the levels are as follows.

(Measures against the first level)

The existing DPS measures are performed under a first level pressurizing condition, and heat is removed on a secondary side by starting the DSS and the auxiliary feedwater and stopping a turbine.

A diverse protection system (DPS) encompasses the DSS, the auxiliary feedwater start, and the turbine stop.

The DSS refers to a system that generates a signal again when no signals are output for inserting a reactor control rod.

All the reactor coolant pumps (e.g., four RCPs) are stopped. Because heat generated by four RCPs is about 10 MWth or higher and has a considerable effect on the ATWS, a signal for automatically stopping the RCP is generated at the first level, thereby preventing additional overpressure due to the heat of the RCP.

The POSRV and the ERDV are opened. At the first level, the POSRV is artificially opened, and the ERDV, i.e. the system for the measures against the severe accident, is also artificially opened, thereby preventing additional pressurization.

(Measures Against the Second Level) Excessive ATWS Detection (about 3000 Psi or Higher)

The squib valve operates to significantly relieve the reactor coolant pressure before progressing to the extreme ATWS.

(Measures Against the Third Level) Extreme ATWS Detection (about 3200 Psi or Higher)

When the pressure reaches 3200 psi or higher despite the measures against the first and second levels, the check valve in the reactor coolant is expected to be stuck in the reverse direction, and it is thus identified that all safe injections are impossible.

At the third level, core damage mitigation measures (operation of the system for dealing with severe accidents) are required, and an IVR-ERVC operation signal is generated. This refers to a method of filling a lower portion of the reactor with water and performing cooling, which cools the outside of the reactor even though the core is damaged, thereby preventing high energy particle melt ejection (HPME) due to the severe accident and preventing threats against the soundness of a containment building due to the HPME.

Specifically, the valve is opened to feed water to the lower portion of the core, and a shutdown cooling pump starts to supply IRWST cooling water to the lower portion of the reactor.

Then, it is identified whether the measure necessary for each level has been performed (S400).

Based on the positions of control rods, the number of opened POSRVs, and the number of opened ERDVs, it is identified whether the measure necessary for each level has been performed, i.e., whether the safety feature have been operated.

To identify whether the necessary measure for each level has been performed, the following information may be used.

Control rod position indicator: identification of the insertion or mechanical failure of the control rod The number of opened POSRVs: identification of overpressure discharging state The number of opened ERDVs: identification of overpressure discharging state Reactivity calculator: calculation of negative reactivity caused by decrease in density of a neutron moderator as the temperature rises Safety injection signal: identification of boric acid water injection such as safety injection Lastly, related information is displayed (S500).

Related information includes input information, accident levels, operation of safety feature, etc.

In the coping system according to the disclosure, the ATWS (the overpressure situation of the reactor coolant system) is accurately identified, and the necessary measures are automatically taken according to the accident levels, thereby lowering the probability of core damage due to the ATWS and preventing radioactive materials from leaking outwards.

According to the disclosure, the measure for each accident level is taken according to the overpressure situation when the ATWS accident occurs in a pressurized nuclear power plant. For example, four RCPs are stopped at the first overpressure level to prevent the overpressure from additionally progressing, and the squib valve is introduced at the second overpressure level to fundamentally prevent the overpressure from progressing to the third level. Although the ATWS of the third level occurs, the IVR-ERVC strategy is early implemented to reduce the severe accident (ATWS), i.e., the threats against the integrity of the containment building due to the HPME, thereby minimizing the leakage of the radioactive materials to the external environments.

The aforementioned embodiments are merely examples for describing the disclosure, and the disclosure is not limited thereto. Various modifications from these embodiments can be made by a person, who has ordinary knowledge in the art to which the disclosure pertains, to implement the disclosure, and thus the technical scope of the disclosure should be defined by the appended claims.

The invention claimed is:

1. A method of dealing with anticipated transient without Safety Control Rod Actuation Mechanism (SCRAM), the method comprising:

checking a first pressure level of a pressurizer;

identifying an accident level based on the first pressure level; and operating a safety feature related to the first pressure level based on the accident level, wherein: the safety feature comprises opening by explosion, a squib valve connected to the pressurizer, the safety feature further comprises a diverse SCRAM system (DSS), an auxiliary feedwater system, a reactor coolant pump (RCP), a pilot operated safety relief valve (POSRV), an emergency rapid depressurization valve (ERDV), and an in-vessel retention ex reactor vessel cooling (IVR-ERVC) system, and the identification of the accident level comprises identifying that the higher the first pressure level of the pressurizer, the higher the accident level, the squib valve is opened at the first pressure level higher than a second pressure level at which at least one of the DSS, a turbine system, the auxiliary feedwater system, the RCP, the POSRV, and the ERDV operates, and the IVR-ERVC system operates at a third pressure level higher than the first pressure level at which the squib valve operates.

2. The method of claim 1, wherein the auxiliary feedwater system comprises a passive auxiliary feedwater system (PAFS).

3. The method of claim 2, further comprising identifying whether a detailed measure is performed for the accident level based on the positions of control rods, the number of opened POSRVs, and the number of opened ERDVs.

4. A system for coping with anticipated transient without Safety Control Rod Actuation Mechanism (SCRAM) in a reactor coolant system of a nuclear power plant, the system comprising:

an input unit that receives a first pressure of a pressurizer;

an accident level identification unit that identifies an accident level based on the first pressure of the pressurizer; and a safety feature operation unit that instructs a safety feature related to the first pressure to operate based on the accident level identified by the accident level identification unit, wherein: the safety feature comprises opening by explosion, a squib valve that is connected to the pressurizer, the safety feature further comprises a diverse SCRAM system (DSS), an auxiliary feedwater system, a reactor coolant pump (RCP), a pilot operated safety relief valve (POSRV), an emergency rapid depressurization valve (ERDV), and an in-vessel retention ex reactor vessel cooling (IVR-ERVC) system, the accident level identification unit identifies that the higher the first pressure level of the pressurizer, the higher the accident level, and the safety feature operation unit instructs the squib valve to be opened by explosion at the first pressure level higher than a second pressure level at which at least one of the DSS, a turbine system, the auxiliary feedwater system, the RCP, the POSRV, and the ERDV operates, and instructs the IVR-ERVC system to operate at a third pressure level higher than the first pressure level at which the squib valve operates.

5. The system of claim 4, further comprising a detailed measure check unit that identifies whether a detailed measure is performed for each accident level based on positions of control rods, number of opened POSRVs, and number of opened ERDVs.

* * * * *